(12) United States Patent
Kageyama et al.

(10) Patent No.: US 8,802,756 B2
(45) Date of Patent: Aug. 12, 2014

(54) LOW-CHARGING FIBER AND METHOD FOR PRODUCING THE SAME

(75) Inventors: Yukako Kageyama, Hino (JP); Susumu Honda, Hino (JP); Makoto Satake, Hino (JP); Hiroaki Kaneko, Hino (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 13/816,058

(22) PCT Filed: Aug. 12, 2011

(86) PCT No.: PCT/JP2011/068728
§ 371 (c)(1),
(2), (4) Date: Feb. 8, 2013

(87) PCT Pub. No.: WO2012/023594
PCT Pub. Date: Feb. 23, 2012

(65) Prior Publication Data
US 2013/0137803 A1 May 30, 2013

(30) Foreign Application Priority Data

Aug. 16, 2010 (JP) ................. 2010-181761

(51) Int. Cl.
*C08K 5/52* (2006.01)
(52) U.S. Cl.
USPC ........................................... 524/145
(58) Field of Classification Search
USPC ............................................ 524/145
See application file for complete search history.

(56) References Cited

U.S. PATENT DOCUMENTS

| 6,005,066 A | 12/1999 | Lehrle et al. |
| 2005/0095695 A1 | 5/2005 | Shindler et al. |
| 2012/0232224 A1* | 9/2012 | Honda et al. ............... 525/333.6 |

FOREIGN PATENT DOCUMENTS

| JP | 8-231837 A | 9/1996 |
| JP | 9-157954 A | 6/1997 |
| JP | 10-36650 A | 2/1998 |
| JP | 10-504583 A | 5/1998 |
| WO | 2006/022430 A1 | 3/2006 |
| WO | 2006/028244 A1 | 3/2006 |
| WO | 2011/115281 A1 | 9/2011 |

OTHER PUBLICATIONS

European Search Report for corresponding Application No. 11818235.1 dated May 27, 2013.
International Search Report of PCT/JP2011/068728, dated Oct. 18, 2011.

* cited by examiner

*Primary Examiner* — Peter Szekely
(74) *Attorney, Agent, or Firm* — Sughrue Mion, PLLC

(57) ABSTRACT

An object to be achieved by the invention is to provide a biodegradable low-charging fiber. The prevent inventors have found that when a specific amount of a specific phospholipid that is not known to have antistatic properties is added to a biodegradable polymer, and the resulting mixture is formed into a fiber having a smooth surface, low-charging properties are developed. The invention has thus been accomplished. The invention is a fiber having an average surface porosity of less than 3% and made of a biodegradable polymer that contains a specific amount of a specific phospholipid.

16 Claims, No Drawings

LOW-CHARGING FIBER AND METHOD FOR PRODUCING THE SAME

CROSS REFERENCE TO RELATED APPLICATIONS

This is a National Stage of International Application No. PCT/JP2011/068728 filed Aug. 12, 2011, the contents of which are incorporated herein by reference in their entirety.

TECHNICAL FIELD

The present invention relates to a low-charging fiber having an average surface porosity of less than 3% and made of a biodegradable polymer that contains a specific amount of a specific phospholipid.

BACKGROUND ART

Various medical devices formed from biodegradable polymers, particularly aliphatic polyesters such as polylactic acid, polyglycolic acid, and polycaprolactone, and copolymers thereof, are known. For example, a formed article in the form of a fiber has been applied to a suture thread or a bioabsorbable sheet.

Electrospinning (also referred to as an electric field spinning method) allows for the easy production of a fiber having a small fiber diameter. According to this production method, the surface area of a fibrous formed article can be increased to enhance adhesion to cells. Therefore, its applications to carriers for cell culture, scaffold materials for regenerative medicine, and the like have been studied.

Generally, it is known that a polyester is easily charged and that the half-life of the built-up charge is long. Accordingly, a fibrous formed article obtained by processing an aliphatic polyester into a fiber is likely to be charged and thus is not easy to use. Thus, a polyester fiber having excellent antistatic properties has been demanded.

However, biodegradable low-charging polyester fibers for in vivo use are heretofore unknown.

JP-A-9-157954 describes an antistatic fiber made of an antistatic polymer and a polyester copolymer. This fiber is naturally degradable and aimed to prevent pollution, and there is no description about in vivo use or use of a low-molecular-weight compound as an antistatic agent.

JP-A-8-231837 describes an antistatic polylactic acid obtained by adding a polyalkylene ether and an antistatic agent made of an aliphatic polyester other than polylactic acid to polylactic acid. However, there is no description about in vivo use or use of a low-molecular-weight compound as the antistatic agent.

WO06/022430 describes a fiber obtained by adding a phospholipid to polylactic acid, but nowhere describes a fiber having antistatic properties.

DISCLOSURE OF THE INVENTION

An object to be achieved by the invention is to provide a biodegradable low-charging fiber.

The prevent inventors have conducted extensive research to achieve the object. As a result, they have found that surprisingly, when a specific amount of a specific phospholipid that is not known to have antistatic properties is added to a biodegradable polymer, and the resulting mixture is formed into a fiber having a smooth surface, low-charging properties are developed. The invention has thus been accomplished.

That is, the invention is a fiber containing a biodegradable polymer that contains a phospholipid and having an average surface porosity of less than 3%. The phospholipid is one of the following: dilauroylphosphatidylcholine in an amount of 0.2 wt % to 5 wt %; dimyristoylphosphatidylcholine in an amount of 0.4 wt % to 5 wt %; dipalmitoylphosphatidylcholine in an amount of 1 wt % to 5 wt %; dioleoylphosphatidylcholine in an amount of 1 wt % to 5 wt %; dioleoylphosphatidylethanolamine in an amount of 1 wt % to 5 wt %; and two or more of the phospholipids in a total amount of 5 wt % or less, the two or more phospholipids being in a total amount of 1 wt % or more, containing at least dilauroylphosphatidylcholine in an amount of 0.2 wt % or more, or containing at least dimyristoylphosphatidylcholine in an amount of 0.4 wt % or more.

The fiber of the invention is biodegradable and also has excellent antistatic properties.

BEST MODE FOR CARRYING OUT THE INVENTION

The fiber of the invention contains one of the following, relative to the biodegradable polymer:

a) dilauroylphosphatidylcholine in an amount of 0.2 wt % to 5 wt %, b) dimyristoylphosphatidylcholine in an amount of 0.4 wt % to 5 wt %, c) dipalmitoylphosphatidylcholine in an amount of 1 wt % to 5 wt %, d) dioleoylphosphatidylcholine in an amount of 1 wt % to 5 wt %, and e) dioleoylphosphatidylethanolamine in an amount of 1 wt % to 5 wt %, or f) two or more of the phospholipids a) to e).

In the case of f), it is necessary to meet both the requirement 1: the total amount of the phospholipids is 5 wt % or less, and the requirement 2: the total amount is 1 wt % or more, at least dilauroylphosphatidylcholine is contained in an amount of 0.2 wt % or more, or at least dimyristoylphosphatidylcholine is contained in an amount of 0.4 wt % or more.

Here, when the phospholipid content is more than 5 wt %, although an antistatic effect is exhibited, the durability or spinning properties of the fiber itself deteriorate. Therefore, this is undesirable.

The phospholipids may be extracted from animal tissue and may also be artificially synthesized.

Examples of biodegradable polymers for use in the invention include aliphatic polyesters such as polylactic acid, polyglycolic acid, polycaprolactone, polydioxanone, lactic acid-glycolic acid copolymers, lactic acid-caprolactone copolymers, polyglycerol sebacic acid, polyhydroxyalkanoic acid, and polybutylene succinate; aliphatic polycarbonates such as polymethylene carbonate; polysaccharide derivatives such as cellulose diacetate, cellulose triacetate, methyl cellulose, propyl cellulose, benzyl cellulose, and carboxymethylcellulose; proteins such as fibroin, gelatin, and collagen; and derivatives thereof. Aliphatic polyesters such as polylactic acid, polyglycolic acid, and lactic acid-glycolic acid copolymers are preferable, and polylactic acid and lactic acid-glycolic acid copolymers are more preferable.

In the case where polylactic acid is used, polymer-forming monomers include, but are not particularly limited to, L-lactic acid and D-lactic acid. In addition, the optical purity or molecular weight of the polymer, the proportions of L- and D-forms, or their arrangement is not particularly limited, but a polymer having a high L-form content is preferable. It is also possible to use a stereocomplex of poly(L-lactic acid) and poly(D-lactic acid).

It is preferable that the biodegradable polymer used in the invention has high purity. In particular, with respect to residues contained in the polymer, such as additives, plasticizers, residual catalysts, residual monomers, and residual solvents used in forming or post-processing, the less residues the better. Particularly in the case of medical applications, the amount of residues needs to be controlled below the safety standard.

In addition, the molecular weight of the biodegradable polymer used in the invention is preferably from $1 \times 10^3$ to $5 \times 10^6$, more preferably from $1 \times 10^4$ to $1 \times 10^6$, and still more preferably from $5 \times 10^4$ to $5 \times 10^5$. In addition, the terminal structure of the polymer and the catalyst for polymer polymerization can be arbitrarily selected.

As long as the desired object is not impaired, other polymers or other compounds may also be mixed into the fiber of the invention. For example, polymer copolymerization, polymer blending, and compound mixing may be performed.

It is preferable that the fiber of the invention has an average fiber diameter of from 0.1 µm to 10 µm. In the case where the average fiber diameter is less than 0.1 µm or more than 10 µm, when such a fiber is formed into a fibrous formed article and used as a medical supply, excellent characteristics are not obtained. The average fiber diameter is more preferably from 1.0 µm to 8.0 µm, and still more preferably from 2.0 µm to 7.0 µm. Incidentally, fiber diameter refers to the diameter of a fiber cross-section. The cross-sectional shape of a fiber is not limited to a circular shape, and may also be an elliptical or modified shape. As the fiber diameter in the case of an elliptical shape, the average of the lengths of the major axis and minor axis is calculated as the fiber diameter. In addition, when the fiber cross-section is not either circular or elliptical, the cross-sectional shape is approximated to a circle or ellipse to calculate the fiber diameter.

The average porosity of the fiber of the invention is less than 3%, more preferably less than 2.5%, and still more preferably less than 2%. The average porosity herein refers to the percentage of the pore area relative to the area of the entire fiber surface, and is determined by the binarization processing of a scanning electron microscope photograph of a fiber structure (×20,000) using image processing software (next New Qube). However, it is also possible to use different image processing software equivalent to the above image processing software.

As an example of a spinning method for providing a fiber with an average porosity of less than 3%, it is possible to reduce the relative humidity during electrospinning. Specifically, the relative humidity is preferably 25% or less, and more preferably 20% or less.

Electrospinning is a method in which a high voltage is applied to a solution of a polymer in a solvent, thereby giving a fibrous formed article on the electrode. Electrospinning usually includes a step of dissolving a polymer in a solvent to produce a solution, a step of applying a high voltage to the solution, a step of discharging the solution, a step of evaporating the solvent from the discharged solution to produce a fibrous formed article, an optional step of dissipating the charge on the produced fibrous formed article, and a step of accumulating the fibrous formed article by charge dissipation (see, e.g., WO06/022430). However, as long as the fiber of the invention can be obtained, other spinning methods such as spunbonding and melt-blowing may also be used.

One of the applications of the fiber of the invention is a fibrous formed article. Such a fibrous formed article is preferably produced without performing a fiber-cutting step during the steps from spinning to processing into a fibrous formed article.

The entire thickness of the fibrous formed article of the invention is not particularly limited, but is preferably from 25 µm to 200 µm, and more preferably from 50 to 100 µm.

As long as the desired object is not impaired, it is possible to perform optional processing. For example, a flocculent fiber structure may be further stacked on the surface of the fibrous formed article of the invention, or a flocculent structure may be inserted between the fibrous formed articles of the invention to form a sandwich structure.

The fiber or fiber structure of the invention may be surface-treated with a chemical such as a surfactant to modify its surface hydrophilicity or hydrophobicity. In medical applications, it is also possible to optionally perform a coating treatment to impart antithrombogenicity or coat the surface with a physiologically active substance such as an antibody. In this case, the coating method, treatment conditions, and chemical drugs used for the treatment may be arbitrarily selected as long as the structure of the fiber is not extremely destroyed and the object of the invention is not impaired.

In addition, the fiber or fibrous formed article of the invention may also optionally contain a drug inside the fiber. In the case where electrospinning is used for the formation, drugs to be used are not particularly limited as long as they are soluble in a volatile solvent and their physiological activities are not lost upon dissolution. Specific examples of such drugs include tacrolimus and analogs thereof, statin drugs, and taxane anticancer drugs. In addition, protein preparations and nucleic acid medicines may also be used as long as their activities can be maintained in a volatile solvent. In addition to drugs, further, metals, polysaccharides, fatty acids, surfactants, and volatile-solvent-resistant microorganisms may also be contained.

The fiber and fibrous formed article of the invention are suitable for use as medical supplies, such as materials for the protection of the surface of organs or wound sites, covering materials, sealing materials, artificial dura mater, adhesion barriers, and hemostatic materials.

EXAMPLES

1. Average Fiber Diameter

The surface of an obtained fibrous formed article was photographed with a scanning electron microscope (Keyence Corporation: trade name "VE 8800") at a magnification of ×2,000. In the obtained photograph, 20 points were selected at random and measured for fiber diameter. The average of all the fiber diameters was calculated as the average fiber diameter (n=20).

2. Average Thickness

Using a high-accuracy digital length gauge (Mitutoyo Corporation: trade name "Litematic VL-50"), the thickness of a fibrous formed article (n=10) was measured with a length-measuring force of 0.01 N, and the average was calculated. Incidentally, the measurement was performed with the minimum measuring force required to use the measuring instrument.

3. Average Apparent Density

The mass of a fibrous formed article was measured, and the average apparent density was calculated based on the area and the average thickness determined by the above methods.

4. Average Porosity

Average porosity was determined by the binarization processing of a scanning electron microscope photograph of an obtained fiber structure (×20,000) using image processing software (next New Qube).

5. Charge Test

Measurement was performed by a charge test in accordance with the medical nonwoven fabric test method of JIS L 1912 (half-life measurement). That is, a specimen was charged in a corona discharge field, and the resulting initial charge amount and the time until the charged voltage was attenuated by half (half-life) were measured.

Example 1

10 parts by weight of polylactic acid (molecular weight: 137,000, manufactured by Taki Chemical) having added thereto 1% dilauroylphosphatidylcholine was dissolved in 80 parts by weight of dichloromethane and 10 parts by weight of ethanol to give a uniform solution. Using the solution, electrospinning was performed to prepare a sheet-like fibrous formed article. The inner diameter of the discharge nozzle was 0.8 mm, the voltage was 8 kV, the distance from the discharge nozzle to the flat cathode plate was 15 cm, and the humidity was 19%. The obtained fibrous formed article had an average fiber diameter of 3.7 µm, a thickness of 80 µm, an average apparent density of 138 kg/m$^3$, and an average porosity of 0%. The initial charge amount was 0.07 kV, and the half-life was 0.5 second.

Example 2

A fibrous formed article was prepared in the same manner as in Example 1, except for using 10 parts by weight of polylactic acid (molecular weight: 137,000, manufactured by Taki Chemical) having added thereto 5% dioleoylphosphatidylethanolamine. The obtained fibrous formed article had an average fiber diameter of 4.0 µm, a thickness of 99 µm, an average apparent density of 165 kg/m$^3$, and an average porosity of 0%. The initial charge amount was 0.188 kV, and the half-life was 0.5 second.

Example 3

A fibrous formed article was prepared in the same manner as in Example 1, except that 11 parts by weight of polylactic acid (molecular weight: 266,000, manufactured by PURAC) having added thereto 0.2% dilauroylphosphatidylcholine was dissolved in 79 parts by weight of dichloromethane and 10 parts by weight of ethanol. The obtained fibrous formed article had an average fiber diameter of 4.4 µm, a thickness of 79 µm, an average apparent density of 139 kg/m$^3$, and an average porosity of 0%. The initial amount of charge was 0.58 kV, and the half-life was 7.6 seconds.

Example 4

A fibrous formed article was prepared in the same manner as in Example 1, except that 11 parts by weight of polylactic acid (molecular weight: 133,000, manufactured by PURAC) having added thereto 0.4% dimyristoylphosphatidylcholine was dissolved in 79 parts by weight of dichloromethane and 10 parts by weight of ethanol. The obtained fibrous formed article had an average fiber diameter of 4.4 µm, a thickness of 91 µm, an average apparent density of 142 kg/m$^3$, and an average porosity of 0%. The initial charge amount was 0.44 kV, and the half-life was 1.5 seconds.

Example 5

A fibrous formed article was prepared in the same manner as in Example 1, except that 11 parts by weight of polylactic acid (molecular weight: 133,000, manufactured by PURAC) having added thereto 1% dipalmitoylphosphatidylcholine was dissolved in 79 parts by weight of dichloromethane and 10 parts by weight of ethanol. The obtained fibrous formed article had an average fiber diameter of 6.2 µm, a thickness of 100 µm, an average apparent density of 137 kg/m$^3$, and an average porosity of 0%. The initial charge amount was 0.49 kV, and the half-life was 4.5 seconds.

Example 6

A fibrous formed article was prepared in the same manner as in Example 1, except that 11 parts by weight of polylactic acid (molecular weight: 133,000, manufactured by PURAC) having added thereto 5% dilauroylphosphatidylcholine was dissolved in 79 parts by weight of dichloromethane and 10 parts by weight of ethanol. The obtained fibrous formed article had an average fiber diameter of 4.0 µm, a thickness of 79 µm, an average apparent density of 116 kg/m$^3$, and an average porosity of 0%. The initial charge amount was 0.02 kV, and the half-life was 0.2 second.

Example 7

A fibrous formed article was prepared in the same manner as in Example 1, except that 11 parts by weight of a lactic acid-glycolic acid copolymer (molecular weight: 115,000, manufactured by PURAC) having added thereto 0.4% dilauroylphosphatidylcholine was dissolved in 79 parts by weight of dichloromethane and 10 parts by weight of ethanol. The obtained fibrous formed article had an average fiber diameter of 3.7 µm, a thickness of 78 µm, an average apparent density of 163 kg/m$^3$, and an average porosity of 0%. The initial charge amount was 0.058 kV, and the half-life was 1.4 seconds.

Example 8

A fibrous formed article was prepared in the same manner as in Example 1, except that 11 parts by weight of polylactic acid (molecular weight: 133,000, manufactured by PURAC) having added thereto 1% dioleoylphosphatidylcholine was dissolved in 79 parts by weight of dichloromethane and 10 parts by weight of ethanol. The obtained fibrous formed article had an average fiber diameter of 4.5 µm, a thickness of 79 µm, an average apparent density of 141 kg/m$^3$, and an average porosity of 0%. The initial charge amount was 0.36 kV, and the half-life was 1 second.

Example 9

A fibrous formed article was prepared in the same manner as in Example 1, except that 11 parts by weight of polylactic acid (molecular weight: 133,000, manufactured by PURAC) having added thereto 0.4% dilauroylphosphatidylcholine was dissolved in 79 parts by weight of dichloromethane and 10 parts by weight of ethanol. The obtained fibrous formed article had an average fiber diameter of 4.0 µm, a thickness of 78 µm, an average apparent density of 144 kg/m$^3$, and an average porosity of 0%. The initial charge amount was 0.338 kV, and the half-life was 1 second.

Comparative Example 1

A fibrous formed article was prepared in the same manner as in Example 1, except that 10 parts by weight of polylactic acid (molecular weight: 137,000, manufactured by Taki Chemical) was dissolved in 90 parts by weight of a dichloromethane solution. The obtained fibrous formed article had an average fiber diameter of 6.2 μm, a thickness of 107 μm, an average apparent density of 148 kg/m$^3$, and an average porosity of 30%. The initial charge amount was 0.528 kV, and no half-life was observed.

Comparative Example 2

A fibrous formed article was prepared in the same manner as in Example 1, except that 11 parts by weight of polylactic acid (molecular weight: 133,000, manufactured by PURAC) having added thereto 0.5% dioleoylphosphatidylcholine was dissolved in 89 parts by weight of dichloromethane, and that spinning was performed at high humidity (36%). The obtained fibrous formed article had an average fiber diameter of 3.9 μm, a thickness of 71 μm, an average apparent density of 147 kg/m$^3$, and an average porosity of 27%. The initial charge amount was 0.38 kV, and no half-life was observed.

Comparative Example 3

A fibrous formed article was prepared in the same manner as in Example 1, except that 11 parts by weight of polylactic acid (molecular weight: 133,000, manufactured by PURAC) having added thereto 0.1% dioleoylphosphatidylethanolamine was dissolved in 89 parts by weight of dichloromethane, and that spinning was performed at high humidity (36%). The obtained fibrous formed article had an average fiber diameter of 4.2 μm, a thickness of 74 μm, an average apparent density of 160 kg/m$^3$, and an average porosity of 36.2%. The initial charge amount was 0.32 kV, and no half-life was observed.

Comparative Example 4

A fibrous formed article was prepared in the same manner as in Example 1, except that 11 parts by weight of polylactic acid (molecular weight: 133,000, manufactured by PURAC) having added thereto 0.5% dioleoylphosphatidylethanolamine was dissolved in 89 parts by weight of dichloromethane, and that spinning was performed at high humidity (36%). The obtained fibrous formed article had an average fiber diameter of 3.9 μm, a thickness of 84 μm, an average apparent density of 156 kg/m$^3$, and an average porosity of 37%. The initial charge amount was 0.42 kV, and no half-life was observed.

Comparative Example 5

A fibrous formed article was prepared in the same manner as in Example 1, except that 11 parts by weight of polylactic acid (molecular weight: 133,000, manufactured by PURAC) having added thereto 0.4% dilauroylphosphatidylcholine was dissolved in 89 parts by weight of dichloromethane, and that spinning was performed at high humidity (31%). The obtained fibrous formed article had an average fiber diameter of 5.5 μm, a thickness of 77 μm, an average apparent density of 135 kg/m$^3$, and an average porosity of 30%. The initial charge amount was 0.3 kV, and no half-life was observed.

INDUSTRIAL APPLICABILITY

The fiber of the invention is biodegradable and also low charging, and further has excellent handleability. Therefore, fiber formed articles made thereof are useful as medical supplies, for example, especially as materials for the protection of the surface of organs or wound sites, covering materials, sealing materials, artificial dura mater, adhesion barriers, and hemostatic materials.

The invention claimed is:

1. A fiber comprising a biodegradable polymer that contains a phospholipid and having an average surface porosity of less than 3%,
   wherein the phospholipid is one of the following:
   dilauroylphosphatidylcholine in an amount of 0.2 wt % to 5 wt %;
   dimyristoylphosphatidylcholine in an amount of 0.4 wt % to 5 wt %;
   dipalmitoylphosphatidylcholine in an amount of 1 wt % to 5 wt %;
   dioleoylphosphatidylcholine in an amount of 1 wt % to 5 wt %; and
   dioleoylphosphatidylethanolamine in an amount of 1 wt % to 5 wt %; or is
   two or more of the phospholipids in a total amount of 5 wt % or less, and in a total amount of 1 wt % or more, or contains at least dilauroylphosphatidylcholine in an amount of 0.2 wt % or more, or contains at least dimyristoylphosphatidylcholine in an amount of 0.4 wt % or more.

2. The fiber according to claim 1, wherein the biodegradable polymer is an aliphatic polyester.

3. The fiber according to claim 1, wherein the biodegradable polymer is polylactic acid and/or a polylactic acid copolymer.

4. The fiber according to claim 1, wherein the biodegradable polymer is polylactic acid.

5. The fiber according to claim 1, produced by electrospinning.

6. A fibrous formed article comprising the fiber of claim 1.

7. The fiber according to claim 2, produced by electrospinning.

8. The fiber according to claim 3, produced by electrospinning.

9. The fiber according to claim 4, produced by electrospinning.

10. A fibrous formed article comprising the fiber of claim 2.
11. A fibrous formed article comprising the fiber of claim 3.
12. A fibrous formed article comprising the fiber of claim 4.
13. A fibrous formed article comprising the fiber of claim 5.
14. A fibrous formed article comprising the fiber of claim 7.
15. A fibrous formed article comprising the fiber of claim 8.
16. A fibrous formed article comprising the fiber of claim 9.

* * * * *